US009951964B2

(12) United States Patent
Kim et al.

(10) Patent No.: US 9,951,964 B2
(45) Date of Patent: Apr. 24, 2018

(54) DEHUMIDIFIER

(71) Applicant: LG ELECTRONICS INC., Seoul (KR)

(72) Inventors: Byungsoon Kim, Seoul (KR); Jongchul Ha, Seoul (KR); Jiwon Chang, Seoul (KR); Junho Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 14/883,910

(22) Filed: Oct. 15, 2015

(65) Prior Publication Data

US 2016/0109144 A1   Apr. 21, 2016

(30) Foreign Application Priority Data

Oct. 16, 2014   (KR) .................. 10-2014-0139923

(51) Int. Cl.
| | | |
|---|---|---|
| *F25D 21/14* | (2006.01) | |
| *F24F 3/153* | (2006.01) | |
| *F24F 1/02* | (2011.01) | |
| *F24F 3/14* | (2006.01) | |

(52) U.S. Cl.
CPC ............... *F24F 3/153* (2013.01); *F24F 1/02* (2013.01); *F24F 3/14* (2013.01); *F24F 3/1405* (2013.01); *F24F 2003/1446* (2013.01); *F24F 2003/1452* (2013.01); *F24F 2221/56* (2013.01)

(58) Field of Classification Search
CPC .................... F24F 3/1423; F24F 2203/1084
USPC .............................. 62/94, 271, 291
See application file for complete search history.

(56) References Cited

U.S. PATENT DOCUMENTS

| | | | | |
|---|---|---|---|---|
| 3,976,458 A | * | 8/1976 | Krug ................ | B60D 1/242 |
| | | | | 62/175 |
| 4,205,529 A | * | 6/1980 | Ko .................... | F24F 3/1417 |
| | | | | 62/235.1 |
| 4,259,849 A | * | 4/1981 | Griffiths ............ | B01D 53/26 |
| | | | | 62/271 |

(Continued)

FOREIGN PATENT DOCUMENTS

| | | |
|---|---|---|
| DE | 87 07 953 | 7/1988 |
| DE | 100 42 830 | 3/2002 |
| JP | 2002-267204 | 9/2002 |

OTHER PUBLICATIONS

European Search Report dated Mar. 7, 2016.

*Primary Examiner* — Melvin Jones
(74) *Attorney, Agent, or Firm* — Ked & Associates LLP

(57) ABSTRACT

A dehumidifier is provided that may include a main body, a compressor provided within the main body to compress a refrigerant, a plurality of heat exchangers provided within the main body to condense the refrigerant compressed in the compressor or to evaporate the refrigerant, a first fan to discharge air, having undergone heat exchange with the refrigerant evaporated in the plurality of heat exchangers and having subsequently undergone heat exchange with the refrigerant condensed in the plurality of heat exchangers, out of the main body, a mode switch to perform switching between operating modes, including a cooling mode and a dehumidification mode, and a second fan to discharge air, having undergone heat exchange with the refrigerant evaporated in the plurality of heat exchangers in the cooling mode, out of the main body.

19 Claims, 10 Drawing Sheets

(56) References Cited

U.S. PATENT DOCUMENTS 4,635,446 A * 1/1987 Meckler ............... B01D 53/263
                                                    62/235.1
4,723,417 A * 2/1988 Meckler ............... B01D 53/263
                                                    62/271
4,928,498 A * 5/1990 Gossler ............... B01D 53/265
                                                    62/152

* cited by examiner

DEHUMIDIFIER

CROSS-REFERENCE TO RELATED PATENT APPLICATIONS

The present application claims priority under 35 U.S.C. 119 and 35 U.S.C. 365 to Korean Patent Application No. 10-2014-0139923 filed in Korea on Oct. 16, 2014, which are hereby incorporated by reference in their entirety.

BACKGROUND

Field of the Disclosure

The present invention relates to a dehumidifier and, more particularly, to a dehumidifier including a compressor, a condenser, an expansion valve, and an evaporator.

Related Art

In general, a dehumidifier is an apparatus that dehumidifies wet indoor air.

The dehumidifier is configured to allow indoor air to pass through heat exchangers, which include a condenser and an evaporator, through which refrigerant flows, in order to reduce the humidity of the air, and thereafter to allow the dehumidified air to be discharged into a room in order to reduce the humidity in the room.

The air discharged from the dehumidifier is raised in temperature while passing through the condenser. When warm air is discharged from the dehumidifier, however, the warm air may be unpleasant for the user.

SUMMARY

A dehumidifier according to the related art requires a complicated flow-path structure in order to attain a cold air function and is configured to discharge air, having passed through an evaporator, through a first outlet or a second outlet, which results in low blowing capability due to an increase in flow resistance in the evaporator.

Therefore, the present invention is made to solve the problems as described above and an object of the present invention is to provide a dehumidifier which is capable of discharging cold air with a simplified configuration.

In accordance with one embodiment of the present invention, the above and other objects can be accomplished by the provision of a dehumidifier including a main body, a compressor provided within the main body and configured to compress refrigerant, a plurality of heat exchangers provided within the main body and configured to condense the refrigerant compressed in the compressor or to evaporate the condensed refrigerant, a first fan configured to discharge air, having undergone heat exchange with the refrigerant evaporated in the heat exchangers and having subsequently undergone heat exchange with the refrigerant condensed in the heat exchangers, out of the main body, a mode switching unit configured to perform switching between operating modes including a cooling mode and a dehumidification mode, and a second fan configured to discharge the air, having undergone heat exchange with the refrigerant evaporated in the heat exchangers in the cooling mode, out of the main body.

In accordance with another embodiment of the present invention, there is provided a dehumidifier including an evaporator configured to evaporate refrigerant, a condenser located after the evaporator in an air flow direction, a compressor connected to the evaporator and the condenser and configured to compress the refrigerant evaporated in the evaporator so as to discharge the refrigerant to the condenser, a four-way valve connected to each of the condenser and the evaporator, a heat exchanger connected to the four-way valve, an expansion valve connected to the heat exchanger and the four-way valve, and a controller configured to control the four-way valve so as to enter a dehumidification mode for guiding the refrigerant, directed from the condenser, to the heat exchanger and guiding the refrigerant, directed from the expansion valve, to the evaporator, or to control the four-way valve so as to enter a cooling mode for guiding the refrigerant, directed from the condenser, to the expansion valve and guiding the refrigerant, directed from the heat exchanger, to the evaporator.

The four-way valve may be connected to the condenser through a condenser outlet path, may be connected to the heat exchanger through a four-way valve-heat exchanger connection path, may be connected to the expansion valve through an expansion valve-heat exchanger connection path, and may be connected to the evaporator through an evaporator inlet path.

The dehumidifier may further include a first fan configured to cause air to sequentially pass through the evaporator and the condenser, and a second fan configured to cause air to pass through the heat exchanger.

The dehumidifier may further include an input unit configured to input a cooling operation, and the controller may control the four-way valve to enter the cooling mode when the cooling operation is input via the input unit.

In accordance with another embodiment of the present invention, there is provided a dehumidifier including an evaporator configured to evaporate refrigerant, a condenser located after the evaporator in an air flow direction, a compressor connected to the evaporator and the condenser and configured to compress the refrigerant evaporated in the evaporator so as to discharge the refrigerant to the condenser, a first expansion valve connected to the condenser and having an adjustable opening degree, a heat exchanger connected to the first expansion valve, a second expansion valve connected to the heat exchanger and the evaporator and having an adjustable opening degree, and a controller configured to perform dehumidification mode control to fully open the first expansion valve and to adjust the second expansion valve to within a set opening degree range and configured to perform cooling mode control to adjust the first expansion valve to within a set opening degree range and to fully open the second expansion valve.

The heat exchanger may be connected to the first expansion valve through a heat exchanger inlet path, and may be connected to the second expansion valve through a heat exchanger outlet path.

The dehumidifier may further include a first fan configured to cause air to sequentially pass through the evaporator and the condenser, and a second fan configured to cause air to pass through the heat exchanger.

The dehumidifier may further include an input unit configured to input a cooling operation, and the controller may control the first expansion valve to within a set opening degree range and the second expansion valve to be fully opened when the cooling operation is input via the input unit.

In accordance with a further embodiment of the present invention, there is a provided a dehumidifier including a main body formed with an air suction port, a first air discharge port, and a second air discharge port, an evaporator configured to evaporate refrigerant, a condenser located after the evaporator in an air flow direction, a compressor connected to the evaporator and the condenser and configured to compress the refrigerant evaporated in the evaporator so as to discharge the refrigerant to the condenser, an expansion valve connected to the condenser and the evaporator, a first fan configured to suction air through the air suction port and to cause the air to sequentially pass through the evaporator and the condenser before being discharged through the first air discharge port, a path-varying wall configured to linearly move to a gap between the condenser and the evaporator, a moving unit configured to move the path-varying wall, and a second fan configured to discharge the air, guided to a surface of the path-varying wall facing the evaporator, to the second air discharge port.

The moving unit may include a rack formed at the path-varying wall, a pinion engaged with the rack, and a drive source configured to rotate the pinion.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Hereinafter, the embodiments disclosed in the present specification will be described in detail with reference to the accompanying drawings.

Figure 1:
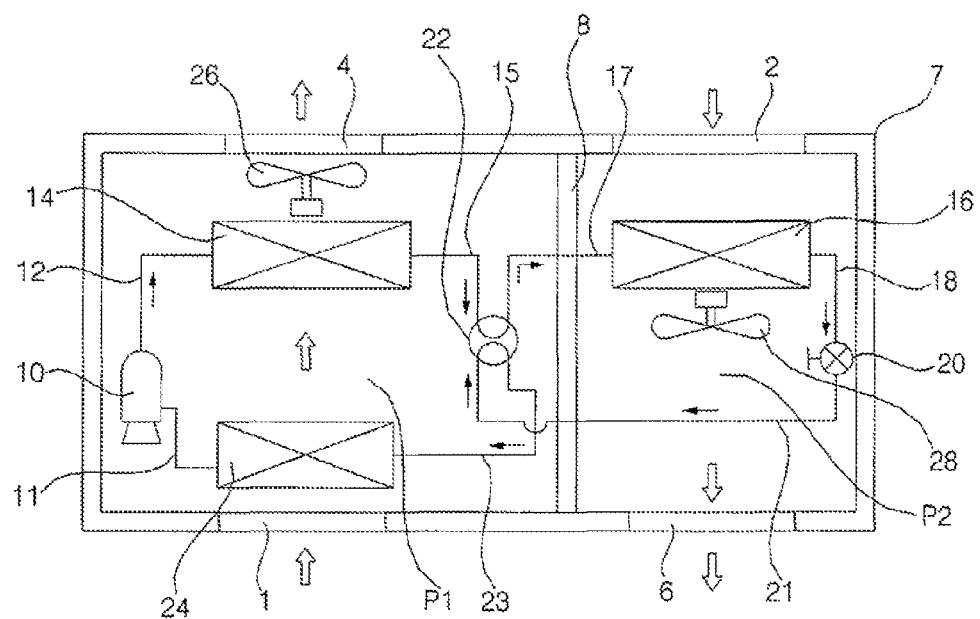
FIG. 1 is a view illustrating the flow of refrigerant in the dehumidification mode of a dehumidifier according to a first embodiment of the present invention.
Figure 2:
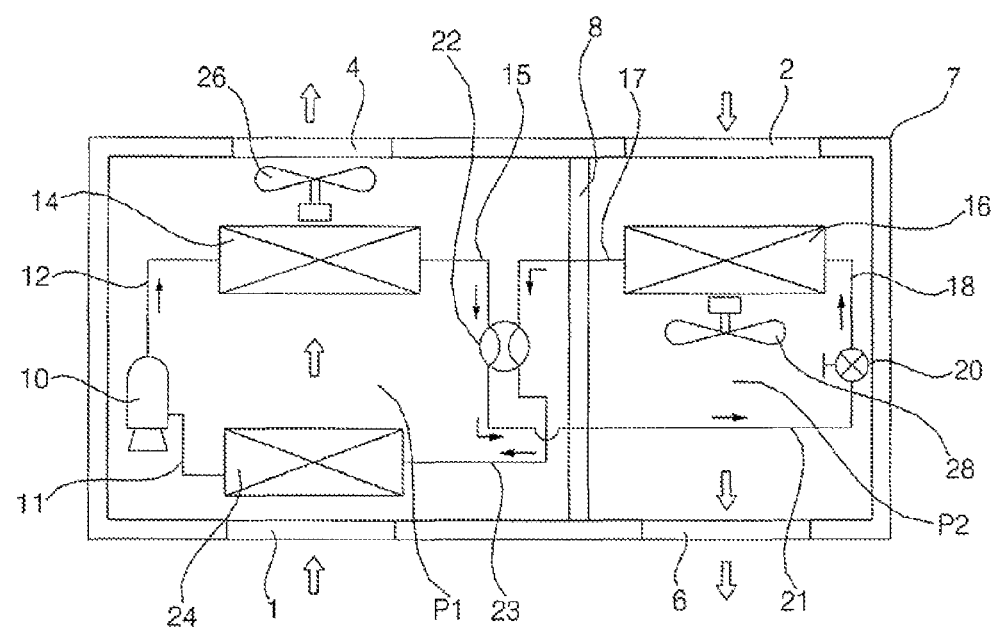
FIG. 2 is a view illustrating the flow of refrigerant in the cooling mode of the dehumidifier according to the first embodiment of the present invention.
Figure 3:
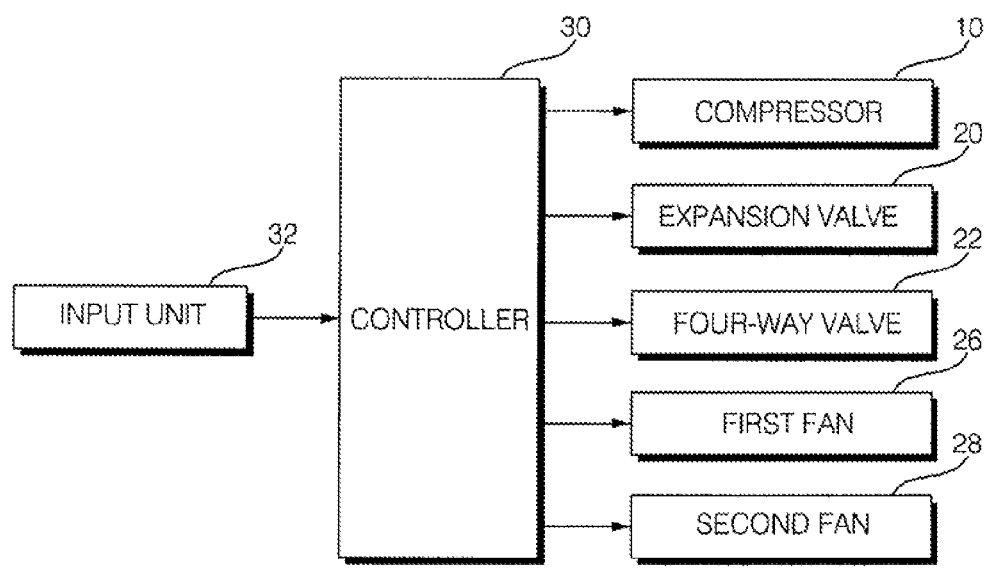
FIG. 3 is a control block diagram of the dehumidifier according to the first embodiment of the present invention.

FIG. 1 is a view illustrating the flow of refrigerant in the dehumidification mode of a dehumidifier according to a first embodiment of the present invention; FIG. 2 is a view illustrating the flow of refrigerant in the cooling mode of the dehumidifier according to the first embodiment of the present invention, and FIG. 3 is a control block diagram of the dehumidifier according to the first embodiment of the present invention.

The dehumidifier of the present embodiment may be formed with air suction ports 1 and 2, a first air discharge port 4, and a second air discharge port 6.

The dehumidifier includes a compressor 10, a condenser 14, a mode heat exchanger 16, an expansion valve 20, an evaporator 24, a four-way valve 22, and a controller 30.

In the first embodiment of the present invention, an operating mode switching unit for switching between the cooling mode and the dehumidification mode includes the four-way valve 22. In addition, in the first embodiment of the present invention, a plurality of heat exchangers includes the condenser 14, the evaporator 24, and the mode heat exchanger 16.

The dehumidifier may include a first air flow-path P1, along which air passes through the evaporator 24 and the condenser 14 in sequence before being discharged through the first air discharge port 4. In addition, the dehumidifier may include a second air flow-path P2, along which air passes through the mode heat exchanger 16 before being discharged through the second air discharge port 6.

The first air flow-path P1 and the second air flow-path P2 may share a single air suction port, or may have respective independent air suction ports.

The dehumidifier may configure the first air flow-path P1 from the first air suction port 1 to the first air discharge port 4, and may configure the second air flow-path P2 from the second air suction port 2 to the second air discharge port 6.

The dehumidifier may include a main body 7 formed with the air suction ports 1 and 2, the first air discharge port 4, and the second air discharge port 6. The main body 7 may be a case defining the external appearance of the dehumidifier. The compressor 10, the condenser 14, the mode heat exchanger 16, the expansion valve 20, and the evaporator 24 are received within the main body 7. A partition wall 8 may be installed to the main body 7 so as to separate the first air flow-path P1 and the second air flow-path P2 from each other. A drain pan, which receives condensate water falling from the evaporator 24, and a bucket in which the condensate water of the drain pan is received, may be arranged in the first air flow path. P1 of the main body 7.

The compressor 10 may be connected to the evaporator 24 and the condenser 14, and serve to compress the refrigerant evaporated in the evaporator 24 and to discharge the compressed refrigerant to the condenser 14. The compressor 10 may compress the refrigerant evaporated while passing through the evaporator 24. The compressor 10 may be connected to the evaporator 24 through a compressor suction path 11. The compressor 10 may be connected to the condenser 14 through a compressor discharge path 12. The refrigerant evaporated in the evaporator 24 may be suctioned into the compressor 10 through the compressor suction path 11, and the refrigerant compressed in the compressor 10 may flow to the condenser 14 through the compressor discharge path 12. Then, the refrigerant directed to the condenser 14 may be condensed while passing through the condenser 14.

The condenser 14 may be located after the compressor 10 in the refrigerant flow direction, so as to condense the refrigerant compressed in the compressor 10 via heat exchange with air.

The condenser 14 may be connected to the four-way valve 22. The condenser 14 may be connected to the four-way valve 22 through a condenser outlet path 15. As such, the refrigerant condensed in the condenser 14 may be introduced into the four-way valve 22 through the condenser outlet path 15.

The condenser 14 may be located in the first air flow-path P1, and serve to perform heat exchange between the refrigerant and the air that passes through the first air flow-path P1. The evaporator 24 as well as the condenser 14 may be arranged in the first air flow-path P1. The condenser 14 may be located after the evaporator 24 in the air flow direction. The condenser 14 and the evaporator 24 may be sequentially arranged in the first air flow-path P1 in the air flow direction. The air may first undergo heat exchange with the evaporator 24, and may thereafter undergo heat exchange with the condenser 14.

The mode heat exchanger 16 may be connected to the four-way valve 22. The mode heat exchanger 16 may be connected to the four-way valve 22 through a valve-heat exchanger connection path 17. The refrigerant, directed from the condenser 14 to the four-way valve 22, may be introduced to the mode heat exchanger 16 through the valve-heat exchanger connection path 17. In contrast, the refrigerant, having passed through the mode heat exchanger 16, may be introduced into the four-way valve 22 through the valve-heat exchanger connection path 17.

The mode heat exchanger 16 may be connected to the expansion valve 20. The mode heat exchanger 16 may be connected to the expansion valve 20 through an expansion valve-heat exchanger connection path 18.

Unlike the condenser 14 and the evaporator 24, the mode heat exchanger 16 may be arranged in the second air flow-path P2, rather than being arranged in the first air flow-path P1. The mode heat exchanger 16 may undergo heat exchange with the air, separately from the condenser 14 and the evaporator 24. The mode heat exchanger 16 may undergo heat exchange with the air passing through the second air flow-path P2. The mode heat exchanger 16 may function as a condensation heat exchanger or an evaporation heat exchanger based on the mode of the four-way valve 22.

In the operation of the dehumidifier, the refrigerant condensed in the condenser 14 may be expanded by the expansion valve 20 after passing through the mode heat exchanger 16 from the four-way valve 22. In this case, the mode heat exchanger 16 may function as a condensation heat exchanger in which the refrigerant condensed in the condenser 14 is condensed via heat exchange with the air. At this time, the air, which has undergone heat exchange with the mode heat exchanger 16, may be hot air having a raised temperature.

Meanwhile, in the operation of the dehumidifier, the refrigerant, expanded by the expansion valve 20, may flow to the four-way valve 22 after passing through the mode heat exchanger 16. In this case, the mode heat exchanger 16 may function as an evaporation heat exchanger in which the refrigerant expanded by the expansion valve 20 is evaporated with heat exchange with the air. At this time, the air, which has undergone heat exchange with the mode heat exchanger 16, may be cold air having a lowered temperature.

The expansion valve 20 may be connected to the four-way valve 22. The expansion valve 20 may be connected to the four-way valve 22 through an expansion valve-valve connection path 21. The refrigerant, introduced into the four-way valve 22 from the condenser 14, may be introduced into the expansion valve 20 through the expansion valve-valve connection path 21 so as to be expanded by the expansion valve 20. Meanwhile, the refrigerant, directed from the mode heat exchanger 16 to the expansion valve 20, may be introduced into the four-way valve 22 through the expansion valve-valve connection path 21.

The four-way valve 22 may be connected to the condenser 14 and the evaporator 24. The four-way valve 22 may be connected to the evaporator 24 through an evaporator inlet path 23. The four-way valve 22 may be connected to the mode heat exchanger 16 and the expansion valve 20. The four-way valve 22 may be connected to each of the condenser 14, the mode heat exchanger 16, the expansion valve 20, and the evaporator 24.

The four-way valve 22 may have the dehumidification mode in which the four-way valve 22 guides the refrigerant, directed from the condenser 14, to the mode heat exchanger 16 and guides the refrigerant, directed from the expansion valve 20, to the evaporator 24. The four-way valve 22 may have the cooling mode in which the four-way valve 22 guides the refrigerant, directed from the condenser 14, to the expansion valve 20, and guides the refrigerant, directed from the mode heat exchanger 16, to the evaporator 24.

The evaporator 24 may be located between the four-way valve 22 and the compressor 10 in the refrigerant flow direction, and the refrigerant, directed from the four-way valve 22, may be evaporated via heat exchange with the air while passing through the evaporator 24. The evaporated refrigerant may flow to the compressor 10. The evaporator 24 may be located in the first air flow-path P1, and serve to perform heat exchange between the refrigerant and the air that passes through the first air flow-path P1. The evaporator 24 may be located before the condenser 14 in the air flow direction. The air introduced into the first air flow-path P1 may first be dehumidified by undergoing heat exchange with the evaporator 24, and then may be raised in temperature by undergoing heat exchange with the condenser 14.

The dehumidifier may include a single fan configured to blow air to both the first air flow-path P1 and the second air flow-path P2. In this case, some of the air blown by the fan may sequentially undergo heat exchange with the evaporator 24 and the condenser 14 while passing through the first air flow-path P1 before being discharged into the room through the first air discharge port 4. The remaining air blown by the fan may undergo heat exchange with the mode heat exchanger 16 while passing through the second air flow-path P2 before being discharged into the room through the second air discharge port 6.

The dehumidifier may include a first fan 26 configured to blow the air so as to pass through the evaporator 24 and the condenser 14 in sequence, and a second fan 28 configured to blow the air so as to pass through the mode heat exchanger 16.

The first fan 26 may blow the air to the first air flow-path P1. The air blown by the first fan 26 may sequentially undergo heat exchange with the evaporator 24 and the condenser 14 while passing through the first air flow-path P1, and may thereafter be discharged into the room through the first air discharge port 4.

The second fan 28 may blow the air to the second air flow-path P2. The air blown by the second fan 28 may undergo heat exchange with the mode heat exchanger 16 while passing through the second air flow-path P2, and may thereafter be discharged into the room through the second air discharge port 6.

In the dehumidification mode and the cooling mode, the dehumidifier may discharge different temperatures of air from the second air flow-path P2. Here, the dehumidification mode may be a room dehumidification mode, and the cooling mode may be a mode which implements the dehumidification of the room and the discharge of cold air from the second air discharge port 6.

The controller 30 may control the compressor 10 and the four-way valve 22. The controller 30 may drive the compressor 10 in the dehumidification mode, and may drive the compressor 10 in the cooling mode. In the case where the expansion valve 20 is an electronic expansion valve having an adjustable opening degree, the controller 30 may control the electronic expansion valve so as to have an opening degree suitable for the expansion of refrigerant. The controller 30 may control the four-way valve 22 to enter the dehumidification mode or the cooling mode.

The controller 30 may control the first fan 26 and the second fan 28. The controller 30 may control the first fan 26 and the second fan 28 so as to exert different flow rates in the dehumidification mode and the cooling mode.

The controller 30 may control the first fan 26 to exert a higher flow rate in the dehumidification mode than in the cooling mode. For example, when the first fan 26 has two-step flow rate modes including a strong wind and a light wind, the controller 30 may control the first fan 26 to enter the strong wind mode in the dehumidification mode, and may control the first fan 26 to enter the light wind mode in the cooling mode.

The controller 30 may control the second fan 28 to exert a higher flow rate in the cooling mode than in the dehumidification mode. For example, when the second fan 28 has two-step flow rate modes including a strong wind and a light wind, the controller 30 may control the second fan 28 to enter the light wind mode in the dehumidification mode, and may control the second fan 28 to enter the strong wind mode in the cooling mode.

In the dehumidification mode, the first fan 26 may blow a greater amount of air than the second fan 28, and a greater amount of air may be blown to the evaporator 24 than to the mode heat exchanger 16. In this case, a large part of the outside air introduced into the dehumidifier may be dehumidified by passing through the evaporator 24 and the condenser 14 before being discharged into the room, and the room may be rapidly dehumidified by the dehumidifier.

Meanwhile, in the cooling mode, the second fan 28 may blow a greater amount of air than the first fan 26, and a greater amount of air may be blown to the mode heat exchanger 16 than to the evaporator 24. In this case, a large part of the outside air introduced into the dehumidifier may be cooled by passing through the mode heat exchanger 16 before being discharged into the room, and the room may be rapidly cooled by the dehumidifier while the evaporator 24 is performing the dehumidification operation.

The dehumidifier may further include an input unit 32 for the input of the operating modes. The input unit 32 may be configured to enable the input of the cooling operation. The input unit 32 may include a cooling operation input unit used to input the cooling operation. The input unit 32 may be configured to enable the input of the dehumidification operation. The input unit 32 may include a dehumidification operation input unit used to input the dehumidification operation. When the cooling operation is input via the input unit 32, the controller 30 may control the four-way valve 22 to enter the cooling mode. When the dehumidification operation is input via the input unit 32, the controller 30 may control the four-way valve 22 to enter the dehumidification mode.

Hereinafter, the operation of the present embodiment having the above-described configuration will be described.

First, when the dehumidification operation is input via the input unit 32, the controller 30 may control the dehumidifier to enter the dehumidification mode. Then, the controller 30 may drive the first fan 26 and the second fan 28.

In the dehumidification mode, as exemplarily illustrated in FIG. 1, the refrigerant compressed in the compressor 10 may sequentially pass through the condenser 14, the four-way valve 22, the mode heat exchanger 16, the expansion valve 20, the four-way valve 22, and the evaporator 24, and thereafter may be suctioned into the compressor 10. In the dehumidification mode, the mode heat exchanger 16 may be located before the expansion valve 20 in the refrigerant flow direction. As such, the mode heat exchanger 16 may function as a condensation heat exchanger that allows the high temperature refrigerant to be condensed by undergoing heat exchange with the air passing through the second air flow-path P2. In this case, the temperature of the air passing through the second air flow-path P2 may be raised by the mode heat exchanger 16 which functions as the condensation heat exchanger.

When the first fan 26 is driven, the air outside the dehumidifier may be suctioned into the dehumidifier through the air suction port 1, and may first pass through the evaporator 24, thereby being dehumidified by the evaporator 24. Thereafter, the dehumidified air may flow to the condenser 14. The air directed to the condenser 14 may be raised in temperature while passing through the condenser 14, and may thereafter be discharged from the dehumidifier through the first air discharge port 4.

In addition, when the second fan 28 is driven, the air outside the dehumidifier may be suctioned into the dehumidifier through the air suction port 2, and may be raised in temperature while passing through the mode heat exchanger 16 by undergoing heat exchange with the high temperature refrigerant passing through the mode heat exchanger 16. Thereafter, the air may be discharged from the dehumidifier through the second air discharge port 6.

The dehumidifier may allow the air to be dispersed to and discharged through the two air discharge ports 4 and 6. In particular, the dehumidifier may allow the dehumidified air having a raised temperature to be discharged through the first air discharge port 4 and the air having a raised temperature to be discharged through the second air discharge port 6.

Meanwhile, when the cooling operation is input via the input unit 32, the controller 30 may control the dehumidifier into the cooling mode. Then, the controller 30 may drive the first fan 26 and the second fan 28.

In the cooling mode, as exemplarily illustrated in FIG. 2, the refrigerant compressed in the compressor 10 may sequentially pass through the condenser 14, the four-way valve 22, the expansion valve 20, the mode heat exchanger 16, the four-way valve 22, and the evaporator 24, and may thereafter be suctioned into the compressor 10. In the cooling mode, the mode heat exchanger 16 may be located after the expansion valve 20 in the refrigerant flow direction. As such, the mode heat exchanger 16 may function as an evaporation heat exchanger that allows the low temperature refrigerant expanded by the expansion valve 20 to undergo heat exchange with the air passing through the second air flow-path P2, thereby being evaporated. In this case, the temperature of the air passing through the second air flow-path P2 may be lowered by the mode heat exchanger 16 which functions as the evaporation heat exchanger.

When the first fan 26 is driven, the air outside the dehumidifier may be suctioned into the dehumidifier through the air suction port 1, and may first pass through the evaporator 24, thereby being dehumidified by the evaporator 24. Thereafter, the dehumidified air may flow to the condenser 14. The air directed to the condenser 14 may be raised in temperature while passing through the condenser 14, and may thereafter be discharged from the dehumidifier through the first air discharge port 4.

In addition, when the second fan 28 is driven, the air outside the dehumidifier may be suctioned into the dehumidifier through the air suction port 2, and may be cooled via heat exchange with the low temperature refrigerant passing through the mode heat exchanger 16. Thereafter, the air may be discharged from the dehumidifier through the second air discharge port 6.

The dehumidifier may allow air to be dispersed to and discharged through the two air discharge ports 4 and 6. In particular, the dehumidifier may allow dehumidified air having a raised temperature to be discharged through the first air discharge port 4 and air cooled by the mode heat exchanger 16 to be discharged through the second air discharge port 6.

Figure 4:
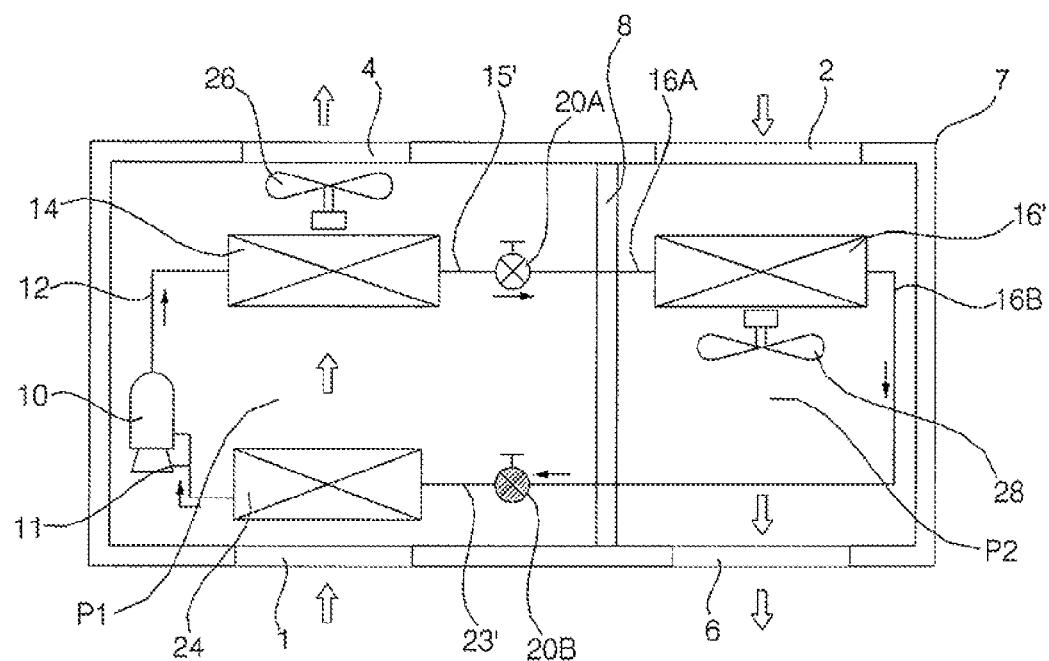
FIG. 4 is a view illustrating the flow of refrigerant in the dehumidification mode of the dehumidifier according to a second embodiment of the present invention.
Figure 5:
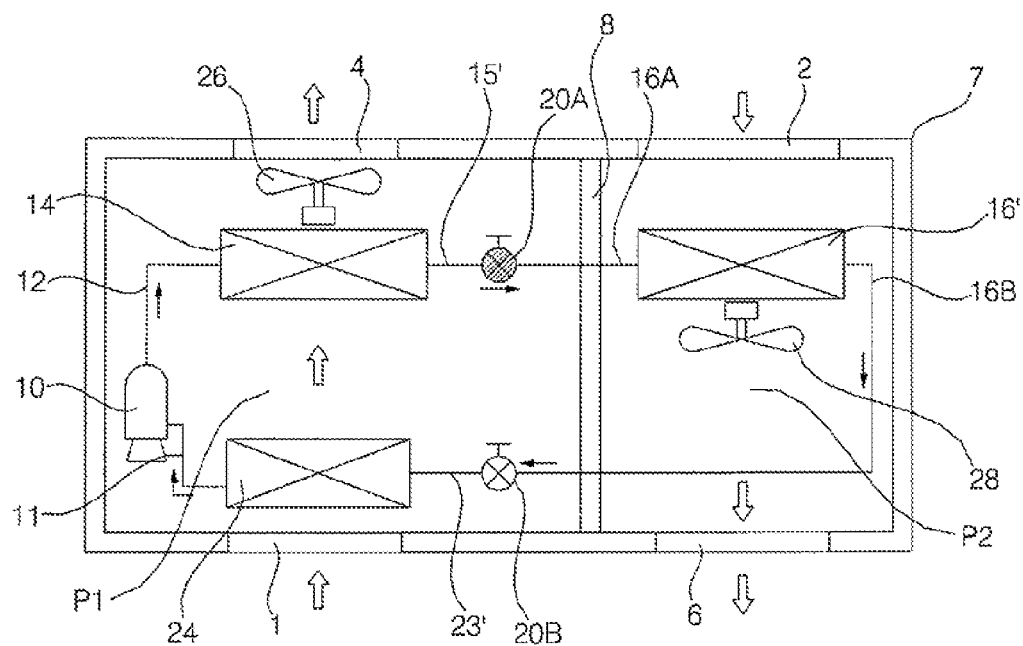
FIG. 5 is a view illustrating the flow of refrigerant in the cooling mode of the dehumidifier according to the second embodiment of the present invention.
Figure 6:
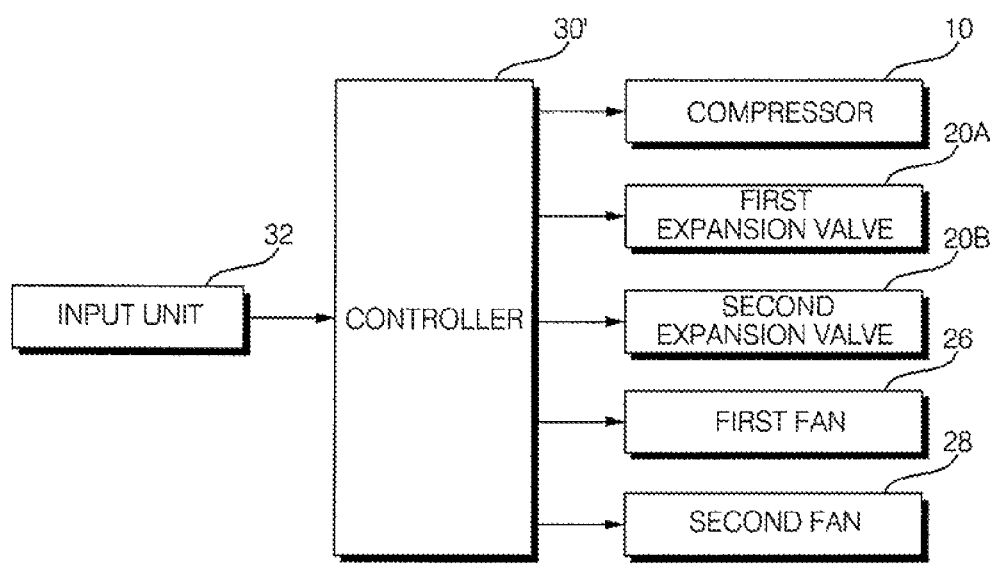
FIG. 6 is a control block diagram of the dehumidifier according to the second embodiment of the present invention.

FIG. 4 is a view illustrating the flow of refrigerant in the dehumidification mode of the dehumidifier according to a second embodiment of the present invention, FIG. 5 is a view illustrating the flow of refrigerant in the cooling mode of the dehumidifier according to the second embodiment of the present invention, and FIG. 6 is a control block diagram of the dehumidifier according to the second embodiment of the present invention.

The dehumidifier of the present embodiment includes a first expansion valve 20A connected to the condenser 14, the opening degree of the first expansion valve 20A being adjustable, a mode heat exchanger 16' connected to the first expansion valve 20A, and a second expansion valve 20B connected to the mode heat exchanger 16' and the evaporator 24, the opening degree of the second expansion valve 20A being adjustable.

In the second embodiment of the present invention, an operating mode switching unit for switching between the cooling mode and the dehumidification mode corresponds to the first expansion valve 20A and the second expansion valve 20B. That is, the mode switching unit of the second embodiment includes the first expansion valve 20A and the second expansion valve 20B.

A controller 30' may perform dehumidification mode control to fully open the first expansion valve 20A and to adjust the second expansion valve 20B to within a set opening degree range. The controller 30' may perform cooling mode control to adjust the first expansion valve 20A to within a set opening degree range and to fully open the second expansion valve 20B. Here, the set opening degree range may be an opening degree that allows the first expansion valve 20A and the second expansion valve 20B to expand the refrigerant, and may be set to be smaller than the fully open degree.

In the same manner as the first embodiment, the present embodiment employs a plurality of heat exchangers, i.e. the condenser 14, the evaporator 24, and the mode heat exchanger 16'.

The dehumidifier of the present embodiment includes the compressor 10, the condenser 14, and the evaporator 24 having the same configurations as those of the first embodiment of the present invention, and these components are designated by the same reference numerals and a detailed description thereof will be omitted below.

The condenser 14 may be connected to the first expansion valve 20A through a condenser outlet path 15', and the refrigerant condensed in the condenser 14 may flow to the first expansion valve 20A through the condenser outlet path 15'.

The first expansion valve 20A may be connected to the mode heat exchanger 16' through a mode heat exchanger inlet path 16A, and the refrigerant having passed through the first expansion valve 20A may be introduced into the mode heat exchanger 16' by passing through the mode heat exchanger inlet path 16A.

The mode heat exchanger 16' may be connected to the second expansion valve 20B through a mode heat exchanger outlet path 16B, and the refrigerant having passed through the mode heat exchanger 16' may be introduced into the second expansion valve 20B by passing through the mode heat exchanger outlet path 16B.

The second expansion valve 20B may be connected to the evaporator 24 through an evaporator inlet path 23', and the refrigerant having passed through the second expansion valve 20B may be introduced into the evaporator 24 through an evaporator inlet path 23'.

In the dehumidifier of the present embodiment, when the compressor 10 is driven, as exemplarily illustrated in FIGS. 4 and 5, the refrigerant compressed in the compressor 10 may sequentially pass through the condenser 14, the first expansion valve 20A, the mode heat exchanger 16, the second expansion valve 20B, and the evaporator 24, and thereafter may be suctioned into the compressor 10. The refrigerant may pass through the aforementioned components in the same sequence regardless of whether the opening mode is the dehumidification mode or the cooling mode. That is, in the dehumidifier of the present embodiment, the refrigerant may flow in the same direction in the dehumidification mode and the cooling mode.

In the dehumidifier of the present embodiment, the mode heat exchanger 16' may function as a condensation heat exchanger or an evaporation heat exchanger based on the opening degrees of the first expansion valve 20A and the second expansion valve 20B.

In the dehumidifier of the present embodiment, the first fan 26 may blow the air to the evaporator 24 and the condenser 14, and the second fan 28 may blow the air to the mode heat exchanger 16'. The first fan 26 and the second fan 28 are identical to those in the first embodiment of the present invention, and thus a detailed description thereof will be omitted below.

When the dehumidification operation is input via the input unit 32, the controller 30' may perform dehumidification mode control to fully open the first expansion valve 20A and to adjust the second expansion valve 20B to within a set opening degree range.

When the cooling operation is input via the input unit 32, the controller 30' may perform cooling mode control to adjust the first expansion valve 20A to within a set opening degree range and to fully open the second expansion valve 20B.

Hereinafter, the operation of the present embodiment having the above-described configuration will be described.

First, when the dehumidification operation is input via the input unit 32, the controller 30' may control the dehumidifier to enter the dehumidification mode. Then, the controller 30' may drive the first fan 26 and the second fan 28.

In the dehumidification mode, the first expansion valve 20A may guide the refrigerant to the mode heat exchanger 16' without expanding the refrigerant, and the mode heat exchanger 16' may function as a condensation heat exchanger that allows the high temperature refrigerant to be condensed by undergoing heat exchange with the air passing through the second air flow-path P2. In this case, the temperature of the air passing through the second air flow-path P2 may be raised by the mode heat exchanger 16' which functions as the condensation heat exchanger.

When the first fan 26 is driven, the air outside the dehumidifier may be suctioned into the dehumidifier through the air suction port 1, and may first pass through the evaporator 24, thereby being dehumidified by the evaporator 24. Thereafter, the dehumidified air may flow to the condenser 14. The air directed to the condenser 14 may be raised in temperature while passing through the condenser 14, and may thereafter be discharged from the dehumidifier through the first air discharge port 4.

In addition, when the second fan 28 is driven, the air outside the dehumidifier may be suctioned into the dehumidifier through the air suction port 2, and may be raised in temperature while passing through the mode heat exchanger 16' via heat exchange with the high temperature refrigerant passing through the mode heat exchanger 16'. Thereafter, the air may be discharged from the dehumidifier through the second air discharge port 6.

Meanwhile, when the cooling operation is input via the input unit 32, the controller 30' may control the dehumidifier to enter the cooling mode. Then, the controller 30 may drive the first fan 26 and the second fan 28.

In the cooling mode, the first expansion valve 20A may expand the refrigerant, and the low temperature and low pressure refrigerant expanded by the first expansion valve 20A may be introduced into the mode heat exchanger 16'. The mode heat exchanger 16' may function as an evaporation heat exchanger that allows the refrigerant to be evaporated by undergoing heat exchange with the air passing through the second air flow-path P2. In this case, the temperature of the air passing through the second air flow-path P2 may be lowered by the mode heat exchanger 16' which functions as the evaporation heat exchanger. The refrigerant evaporated by the mode heat exchanger 16' may pass through the second expansion valve 20B, and may thereafter flow to the evaporator 24.

When the first fan 26 is driven, the air outside the dehumidifier may be suctioned into the dehumidifier through the air suction port 1, and may first pass through the evaporator 24, thereby being dehumidified by the evaporator 24. Thereafter, the dehumidified air may flow to the condenser 14. The air directed to the condenser 14 may be raised in temperature while passing through the condenser 14, and may thereafter be discharged from the dehumidifier through the first air discharge port 4.

In addition, when the second fan 28 is driven, the air outside the dehumidifier may be suctioned into the dehumidifier through the air suction port 2, and may be cooled via heat exchange with the low temperature refrigerant passing through the mode heat exchanger 16'. Thereafter, the air may be discharged from the dehumidifier through the second air discharge port 6.

Figure 7:
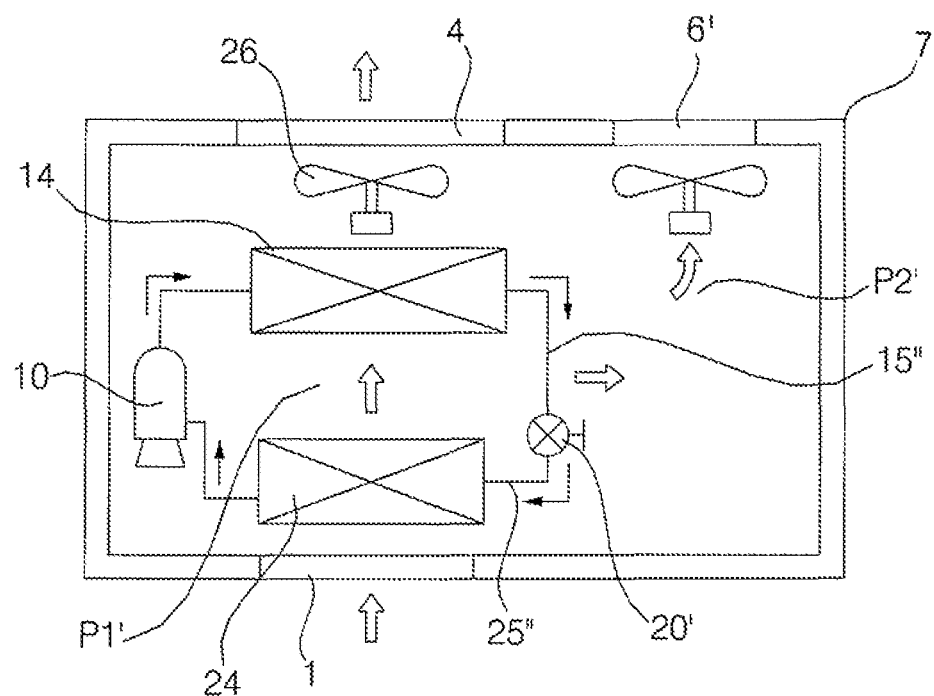
FIG. 7 is a view illustrating the flow of refrigerant of the dehumidifier according to a third embodiment of the present invention.
Figure 8:
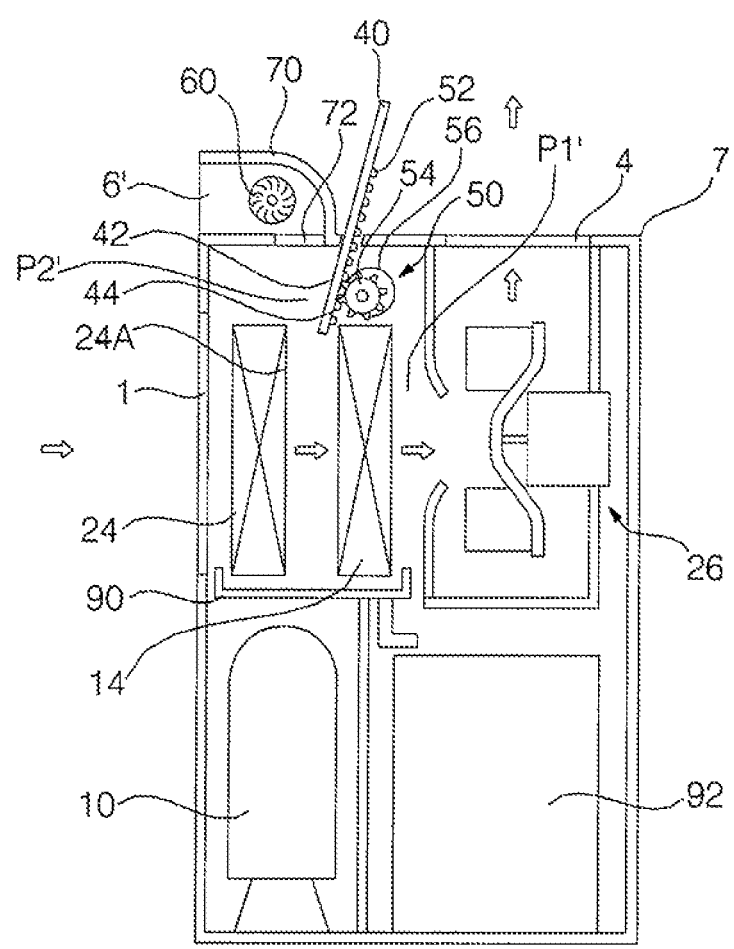
FIG. 8 is a view illustrating the flow of air in the dehumidification mode of the dehumidifier according to the third embodiment of the present invention.
Figure 9:
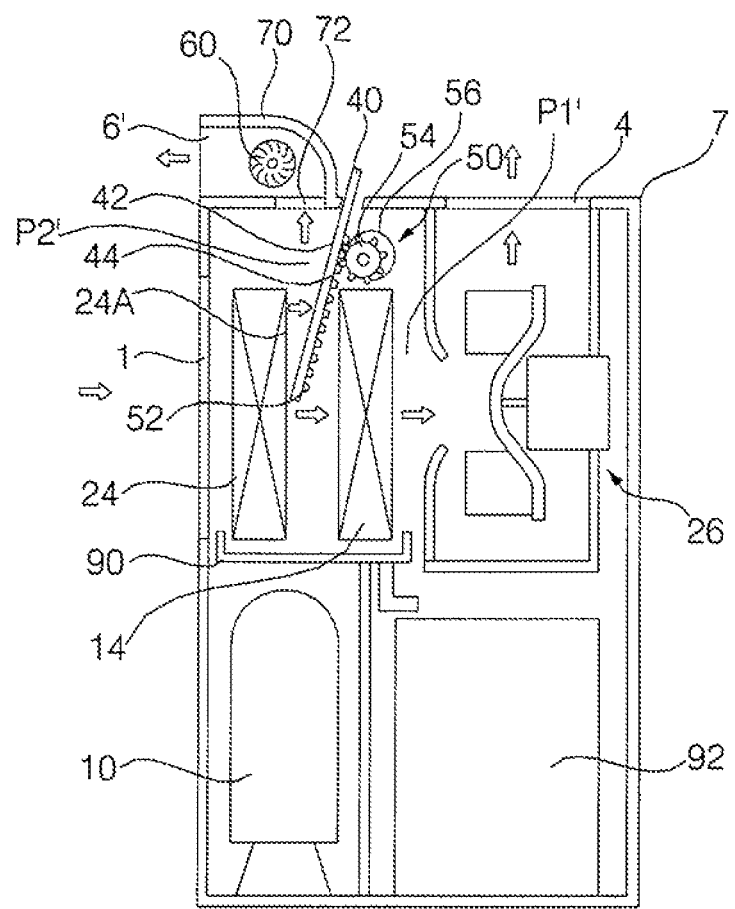
FIG. 9 is a view illustrating the flow of air in the cooling mode of the dehumidifier according to the third embodiment of the present invention.
Figure 10:
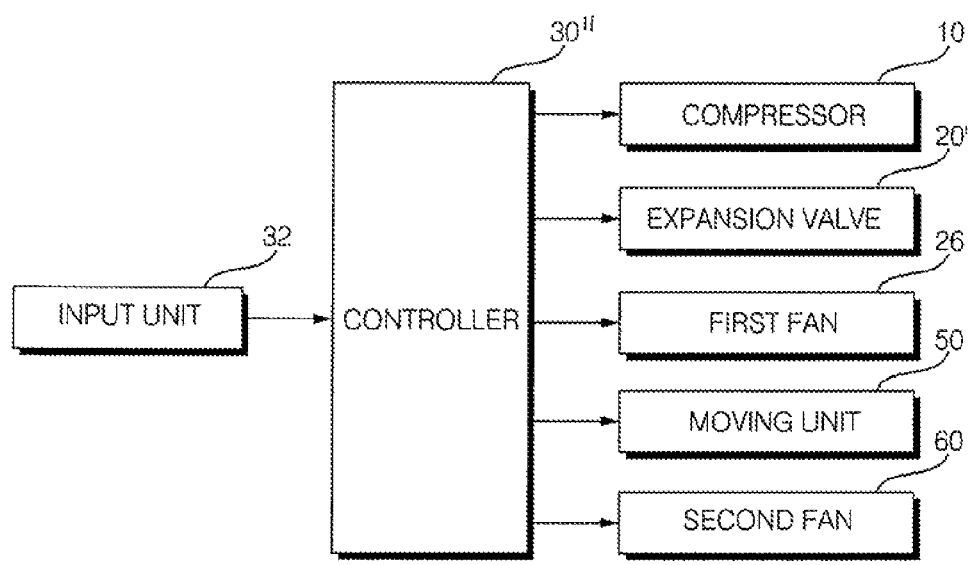
FIG. 10 is a control block diagram of the dehumidifier according to the third embodiment of the present invention.

FIG. 7 is a view illustrating the flow of refrigerant of the dehumidifier according to a third embodiment of the present invention, FIG. 8 is a view illustrating the flow of air in the dehumidification mode of the dehumidifier according to the third embodiment of the present invention, FIG. 9 is a view illustrating the flow of air in the cooling mode of the dehumidifier according to the third embodiment of the present invention, and FIG. 10 is a control block diagram of the dehumidifier according to the third embodiment of the present invention.

The dehumidifier may include the main body 7 formed with the air suction port 1, the first air discharge port 4, and a second air discharge port 6'.

The dehumidifier may include the compressor 10, the condenser 14, an expansion valve 20', and the evaporator 24. The compressor 10, the condenser 14, and the evaporator 24 are identical to those of the first embodiment of the present invention, and thus a detailed description thereof will be omitted below. The expansion valve 20' may be connected to the condenser 14 and the evaporator 24. The expansion valve 20' may be connected to the condenser 14 through a condenser outlet path 15", and may be connected to the evaporator 24 through an evaporator inlet path 25".

The dehumidifier may include the first fan 26, which suctions the air through the air suction port 1 and causes the air to sequentially pass through the evaporator 24 and the condenser 14 before being discharged through the first air discharge port 4. The first fan 26 may be located after the condenser 14 in the air flow direction, and serve to cause the air to sequentially pass through the evaporator 24 and the condenser 14 and be discharged through the first air discharge port 4.

The dehumidifier may include a path-varying wall 40 located in a linearly movable manner between the condenser 14 and the evaporator 24, a moving unit 50 configured to move the path-varying wall 40, and a second fan 60 configured to discharge the air, guided to a surface 42 of the path-varying wall 40 that faces the evaporator 24, through the second air discharge port 6'.

In the third embodiment of the present invention, an operating mode switching unit for switching between the cooling mode and the dehumidification mode correspond to the path-varying wall 40 and the moving unit 50. That is, the mode switching unit of the third embodiment includes the path-varying wall 40 and the moving unit 50. In addition, in the third embodiment of the present invention, a plurality of heat exchangers includes the condenser 14 and the evaporator 24.

The dehumidifier may include a first air flow-path P1', along which the air, suctioned through the air suction port 1, passes through the evaporator 24, the condenser 14, and the first fan 26 in sequence, and thereafter is discharged through the first air discharge port 4. In addition, the dehumidifier may include a second air flow-path P2' which is connected to the first air flow-path P1' and guides some of the air passing through the first air flow-path P1' so as to be discharged through the second air discharge port 6'. The second air flow-path P2' may be diverged at a position in the first air flow-path P1' between the evaporator 24 and the condenser 14. Some of the air, cooled while passing through the evaporator 24, may flow to the condenser 14, and may thereafter be discharged through the first air discharge port 4 via the first fan 26. The remaining air, cooled while passing through the evaporator 24, may be discharged through the second air discharge port 6' without passing through the condenser 14.

A portion of the path-varying wall 40, introduced between the evaporator 24 and the condenser 14, may function as an air guide that guides the flow direction of air to the second fan 60. As the area of the introduced portion increases, a greater amount of air may be guided to the second fan 60.

The path-varying wall 40 may have one surface 42 facing the evaporator 24 and the other surface 44 facing the condenser 44. As the position of the path-varying wall 40 varies, the depth, to which the path-varying wall 40 is inserted between the evaporator 24 and the condenser 14, may vary. The path-varying wall 40 may reduce the amount of air that is directed to the condenser 14 and increase the amount of air that is guided to the second fan 60 as the area of the surface 42 facing the evaporator 24 increases. The path-varying wall 40 may wholly be configured as a flat plate. Of course, the path-varying wall 40 may be configured as a curved plate, at least a portion of which is curved. The path-varying wall 40 may be tilted, and may be introduced between the evaporator 24 and the condenser 14 such that a portion of the path-varying wall 40 is located above the condenser 14. The path-varying wall 40 may move forward in the tilting direction toward one surface 24A of the evaporator 24 that faces the condenser 14, and may move backward in the direction opposite to the forward movement direction.

The moving unit 50 may include a rack 52 formed at the path-varying wall 40, a pinion 54 engaged with the rack 52, and a drive source 56 configured to rotate the pinion 54. The moving unit 50 may adjust the depth, to which the path-varying wall 40 is inserted between the evaporator 24 and the condenser 14. The drive source 66 may be configured as a motor, and more particularly, a step motor. The moving unit 50 may be operated in the dehumidification mode to cause the path-varying wall 40 not to be located between the evaporator 24 and the condenser 14 or to cause the path-varying wall 40 to be inserted to a first depth between the evaporator 24 and the condenser 14. The moving unit 50 may be operated in the cooling mode to cause the path-varying wall 40 to be inserted to a second depth, which is greater than the first depth, between the evaporator 24 and the condenser 14.

The second fan 60 may suction some of the air having passed through the evaporator 24 and discharge the suctioned air through the second air discharge port 6. The second fan 60 may stop operation while the moving unit 50 is operated in the dehumidification mode. The second fan 60 may be driven while the moving unit 50 is operated in the cooling mode, so as to discharge the air, guided to the path-varying wall 40, through the second air discharge port 6'.

The dehumidifier of the present embodiment may further include a discharge guide 70, at least a portion of which faces a gap between the evaporator 24 and the condenser 14. The discharge guide 70 may include an inlet port 72, through which the air guided by the path-varying wall 40 is introduced. The second air discharge port 6' may be formed in the discharge guide 70. The discharge guide 70 may define a blowing passage between the inlet port 72 and the second air discharge port 6' for the passage of air blown by the second fan 60. The blowing passage may configure a portion of the second air flow-path P2'. The second air discharge port 6' may be open in a direction different from the first air discharge port 4.

The second fan 60 may be installed so as to be located inside the discharge guide 70. The second fan 60 may be an axial-flow fan or a cross-flow fan, and may suction the air through the inlet port 72 and discharge the air through the second air discharge port 6'.

The dehumidifier of the present embodiment may include a controller 30" which controls the compressor 10, the first fan 26 the moving unit 50, and the second fan 60. When attempting to control the moving unit 50, the controller 30" may control the motor which is the drive source 56.

When the dehumidification operation is input via the input unit 32, the controller 30" may control the moving unit 50 so as to be operated in the dehumidification mode, and may drive the first fan 26 and stop the operation of the second fan 60.

When the cooling operation is input via the input unit 32, the controller 30" may control the moving unit 50 so as to be operated in the cooling mode, and may drive both the first fan 26 and the second fan 60.

In FIGS. 8 and 9, reference numeral 90 designates a drain pan, which is installed so as to be located below the evaporator 24 and the condenser 14 and serves to receive condensate water falling from the evaporator 24, and reference numeral 92 designates a bucket in which the condensate water directed to the drain pan 90 is received.

Hereinafter, the operation of the present embodiment having the above-described configuration will be described.

First, when the dehumidification operation is input via the input unit 32, the controller 30" may control the moving unit 50 so as to be operated in the dehumidification mode and may drive the first fan 26.

In the dehumidification mode of the moving unit 50, the path-varying wall 40 may be located outside the gap between the evaporator 24 and the condenser 14 so as not to face the evaporator 24, or may be inserted to a first depth between the evaporator 24 and the condenser 14.

In addition, when the first fan 26 is driven, the air outside the dehumidifier may be suctioned into the dehumidifier through the air suction port 1 and dehumidified while passing through the evaporator 24. Thereafter, the dehumidified air may be raised in temperature while passing through the condenser 14. The air having passed through the condenser 14 may pass through the first fan 26 to thereby be discharged through the first air discharge port 4.

When the cooling operation is input via the input unit 32, the controller 30" may control the moving unit 50 so as to be operated in the cooling mode and may drive the first fan 26 and the second fan 60.

In the cooling mode of the moving unit 50, the path-varying wall 40 may be inserted to a second depth between the evaporator 24 and the condenser 14. The area of the path-varying wall 40 that faces the evaporator 24 may increase compared to the case in which the path-varying wall 40 is inserted to the first depth.

When the first fan 26 and the second fan 60 are driven, the air outside the dehumidifier may be suctioned into the dehumidifier through the air suction port 1. The air suctioned through the air suction port 1 may loss heat to the evaporator 24 and may be dehumidified while passing through the evaporator 24.

Some of the air having passed through the evaporator 24 may flow to the condenser 14, thereby undergoing heat exchange with the condenser 14 and being raised in temperature by the condenser 14. The air whose temperature has been raised by the condenser 14 may pass through the first fan 26 and be discharged through the first air discharge port 4.

Meanwhile, the remaining air having passed through the evaporator 24 may collide with the surface 42 of the path-varying wall 40, thereby being guided by the surface 42 of the path-varying wall 40 so as to be suctioned to the second fan 60, rather than flowing to the condenser 14. The air suctioned into the second fan 60 may be discharged through the second air discharge port 6' without passing through the condenser 14 and the first fan 26. That is, the dehumidifier may discharge the dehumidified air having the raised temperature through the first air discharge port 4 and may discharge the air cooled by the evaporator 24 through the second air discharge port 6'. The air having different temperatures may be discharged from the dehumidifier through the first air discharge port 4 and the second air discharge port 6'.

Meanwhile, the present invention is not limited to the above embodiments, and of course, various modifications are possible within the technical range of the present invention.

As is apparent from the above description, a dehumidifier of the present invention has advantages of minimizing unpleasantness caused when only warm air, which is raised in temperature while passing through a condenser, is discharged, and of achieving increased usefulness because cold air discharged through a second air discharge port may cool the surrounding room.

In addition, the dehumidifier of the present invention has an advantage of discharging cold air using a simplified configuration that includes a four-way valve.

In addition, the dehumidifier of the present invention has an advantage of discharging cold air by controlling a first expansion valve and a second expansion valve in a simplified manner.

In addition, the dehumidifier of the present invention has an advantage of discharging dehumidified air and cooled air separately through a first air discharge port and a second air discharge port using a simplified configuration that includes a moving unit and a second fan without changing a refrigeration cycle which is comprised of a compressor, a condenser, an expansion valve, and an evaporator.

What is claimed is:

1. A dehumidifier, comprising:
    a main body;
    a compressor provided within the main body to compress a refrigerant;
    a plurality of heat exchangers provided within the main body to condense the refrigerant compressed in the compressor or to evaporate the refrigerant;
    a first fan to discharge air, having undergone heat exchange with the refrigerant evaporated in the plurality of heat exchangers and having subsequently undergone heat exchange with the refrigerant condensed in the plurality of heat exchangers, out of the main body;
    a mode switch to perform switching between operating modes inducing a cooling mode and a dehumidification mode; and
    a second fan to discharge air, having undergone heat exchange with the refrigerant evaporated in the plurality of heat exchangers in the cooling mode, out of the main body, wherein the plurality of heat exchangers includes:
        a condenser connected to the compressor and the mode switch to condense the refrigerant;
        an evaporator connected to the compressor and the mode switch to evaporate the refrigerant; and
        a mode heat exchanger connected to the mode switch, wherein the second fan discharges the refrigerant, having undergone heat exchange in the mode heat exchanger, out of the main body, and wherein the mode switch causes the mode heat exchanger to evaporate the refrigerant in the cooling mode and causes the mode heat exchanger to condense the refrigerant in the dehumidification mode, thereby allowing the second fan to discharge the air, having undergone heat exchange with the refrigerant condensed in the mode heat exchanger, out of the main body.

2. The dehumidifier according to claim 1, wherein the condenser is located after the evaporator in an air flow direction.

3. The dehumidifier according to claim 1, wherein the main body includes a first air discharge port and a second air discharge port, wherein air, having sequentially undergone heat exchange with the evaporator and the condenser, is discharged through the first air discharge port, and wherein air, having undergone heat exchange with the mode heat exchanger, is discharged through the second air discharge port.

4. The dehumidifier according to claim 1, further including:
    an expansion valve connected to the mode switch and the mode heat exchanger to expand the refrigerant, wherein the mode switch, in the cooling mode, guides the refrigerant, condensed in the condenser, to the expansion valve and guides the refrigerant, expanded in the expansion valve and evaporated in the mode heat exchanger, to the evaporator, and in the dehumidification mode, guides the refrigerant, condensed in the condenser, to the mode heat exchanger and guides the refrigerant, condensed in the mode heat exchanger and expanded in the expansion valve, to the evaporator.

5. The dehumidifier according to claim 4, wherein the mode switch is four-way valve, and wherein the four-way valve is connected to the condenser through a condenser outlet path, wherein the four-way valve is connected to the mode heat exchanger through a four-way valve-mode heat exchanger connection path, wherein the four-way valve is connected to the expansion valve through an expansion valve-valve connection path, and wherein the four-way valve is connected to the evaporator through an evaporator inlet path.

6. The dehumidifier according to claim 1, wherein the mode switch includes:
    a first expansion valve connected to the condenser and having an adjustable opening degree; and
    a second expansion valve connected to the mode heat exchanger and the evaporator and having an adjustable opening degree, wherein the first expansion valve is adjusted to within a predetermined opening degree range in the cooling mode so as to expand the refrigerant, and is fully opened in the dehumidification mode, and wherein the second expansion valve is fully opened in the cooling mode and is adjusted to within a predetermined opening degree range in the dehumidification mode so as to expand the refrigerant.

7. The dehumidifier according to claim 6, wherein the mode heat exchanger is connected to the first expansion valve through a mode heat exchanger inlet path, and is connected to the second expansion valve through a mode heat exchanger outlet path.

8. A dehumidifier, comprising:
    a main body;
    a compressor provided within the main body to compress a refrigerant;
    a plurality of heat exchangers provided within the main body to condense the refrigerant compressed in the compressor or to evaporate the refrigerant;
    a first fan to discharge air, having undergone heat exchange with the refrigerant evaporated in the plurality of heat exchangers and having subsequently undergone heat exchange with the refrigerant condensed in the plurality of heat exchangers, out of the main body;
    a mode switch to perform switching between operating modes including a cooling mode and a dehumidification mode; and
    a second fan to discharge air, having undergone heat exchange with the refrigerant evaporated in the plurality of heat exchangers in the cooling mode, out of the main body, wherein the plurality of heat exchangers includes;
    an evaporator to evaporate the refrigerant; and
    a condenser to condense the refrigerant, wherein the dehumidifier further includes an expansion valve connected to the condenser and the evaporator, wherein the mode switch includes:

a path-varying wall located to linearly move into a region between the condenser and the evaporator in the cooling mode; and a mover to move the path-varying wall, wherein the first fan discharges the air, having sequentially passed through the evaporator and the condenser, out of the main body, in the dehumidification mode, and wherein the second fan discharges air, guided to a surface of the path-varying wall that faces the evaporator, out of the main body, in the cooling mode, and stops operation in the dehumidification mode.

9. The dehumidifier according to claim 8, wherein the mover includes:

a rack formed on the path-varying wall;
a pinion engaged with the rack; and
a drive to rotate the pinion.

10. The dehumidifier according to claim 8, wherein the dehumidifier includes a first airflow path and a second airflow path, and wherein the first airflow path and the second airflow are separated by a partition wall.

11. A dehumidifier, comprising:

a main body having at least one air suction port and first and second discharge ports;

a compressor provided within the main body to compress a refrigerant;

a plurality of heat exchangers provided within the main body to condense the refrigerant compressed in the compressor or to evaporate the refrigerant;

a first fan to discharge air, having undergone heat exchange with the refrigerant evaporated in the plurality of heat exchangers and having subsequently undergone heat exchange with the refrigerant condensed in the plurality of heat exchangers, out of the main body through the first discharge port;

a mode switch to perform switching between operating modes including a cooling mode and a dehumidification mode; and a second fan to discharge air, having undergone heat exchange with the refrigerant evaporated in the plurality of heat exchangers in the cooling mode, out of the main body through the second discharge port.

12. The dehumidifier according to claim 11, wherein the plurality of heat exchangers includes:

a condenser connected to the compressor and the mode switch to condense the refrigerant;

an evaporator connected to the compressor and the mode switch to evaporate the refrigerant; and a mode heat exchanger connected to the mode switch, wherein the second fan discharges the refrigerant, having undergone heat exchange in the mode heat exchanger, out of the main body through the second discharge port, and wherein the mode switch causes the mode heat exchanger to evaporate the refrigerant in the cooling mode and causes the mode heat exchanger to condense the refrigerant in the dehumidification mode, thereby allowing the second fan to discharge the air, having undergone heat exchange with the refrigerant condensed in the mode heat exchanger, out of the main body through the second discharge port.

13. The dehumidifier according to claim 12, wherein the condenser is located after the evaporator in an air flow direction.

14. The dehumidifier according to claim 12, further including:

an expansion valve connected to the mode switch and the mode heat exchanger to expand the refrigerant, wherein the mode switch, in the cooling mode, guides the refrigerant, condensed in the condenser, to the expansion valve and guides the refrigerant, expanded in the expansion valve and evaporated in the mode heat exchanger, to the evaporator, and in the dehumidification mode, guides the refrigerant, condensed in the condenser, to the mode heat exchanger and guides the refrigerant, condensed in the mode heat exchanger and expanded in the expansion valve, to the evaporator.

15. The dehumidifier according to claim 14, wherein the mode switch is four-way valve, and wherein the four-way valve is connected to the condenser through a condenser outlet path, wherein the four-way valve is connected to the mode heat exchanger through a four-way valve-mode heat exchanger connection path, wherein the four-way valve is connected to the expansion valve through an expansion valve-valve connection path, and wherein the four-way valve is connected to the evaporator through an evaporator inlet path.

16. The dehumidifier according to claim 12, wherein the mode switch includes:

a first expansion valve connected to the condenser and having an adjustable opening degree; and a second expansion valve connected to the mode heat exchanger and the evaporator and having an adjustable opening degree, wherein the first expansion valve is adjusted to within a predetermined opening degree range in the cooling mode so as to expand the refrigerant, and is fully opened in the dehumidification mode, and wherein the second expansion valve is fully opened in the cooling mode and is adjusted to within a predetermined opening degree range in the dehumidification mode so as to expand the refrigerant.

17. The dehumidifier according to claim 16, wherein the mode heat exchanger is connected to the first expansion valve through a mode heat exchanger inlet path, and is connected to the second expansion valve through a mode heat exchanger outlet path.

18. The dehumidifier according to claim 11, wherein the plurality of heat exchangers includes:

an evaporator to evaporate the refrigerant; and a condenser to condense the refrigerant, wherein the dehumidifier further includes an expansion valve connected to the condenser and the evaporator, wherein the mode switch includes:

a path-varying wall located to linearly move into a region between the condenser and the evaporator in the cooling mode; and a mover to move the path-varying wall, wherein the first fan discharges the air, having sequentially passed through the evaporator and the condenser, out of the main body through the first discharge port, in the dehumidification mode, and wherein the second fan discharges air, guided to a surface of the path-varying wall that faces the evaporator, out of the main body through the second discharge port, in the cooling mode, and stops operation in the dehumidification mode.

19. The dehumidifier according to claim 18, wherein the mover includes:

a rack formed on the path-varying wall;
a pinion engaged with the rack; and
a drive to rotate the pinion.

* * * * *